(12) United States Patent
Bae et al.

(10) Patent No.: US 11,216,383 B2
(45) Date of Patent: Jan. 4, 2022

(54) STORAGE DEVICE PROVIDING A VIRTUAL MEMORY REGION, ELECTRONIC SYSTEM INCLUDING THE SAME, AND METHOD OF OPERATING THE SAME

(71) Applicant: SAMSUNG ELECTRONICS CO., LTD., Suwon-si (KR)

(72) Inventors: Duck-Ho Bae, Seoul (KR); Dong-Uk Kim, Seoul (KR); Hyung-Woo Ryu, Suwon-si (KR); Kwang-Hyun La, Uiwang-si (KR); Joo-Young Hwang, Suwon-si (KR); You-Ra Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 16/291,402

(22) Filed: Mar. 4, 2019

(65) Prior Publication Data
US 2020/0042459 A1 Feb. 6, 2020

(30) Foreign Application Priority Data
Aug. 2, 2018 (KR) .......................... 10-2018-0090124

(51) Int. Cl.
*G06F 12/1009* (2016.01)
*G06F 12/10* (2016.01)
(Continued)

(52) U.S. Cl.
CPC .. *G06F 12/1009* (2013.01); *G06F 2212/1008* (2013.01); *G06F 2212/152* (2013.01); *G06F 2212/657* (2013.01)

(58) Field of Classification Search
CPC .......... G06F 12/1009; G06F 2212/657; G06F 2212/152; G06F 2212/1008;
(Continued)

(56) References Cited

U.S. PATENT DOCUMENTS 5,276,867 A * 1/1994 Kenley ................... G06F 12/08
6,425,047 B1 * 7/2002 Ozaki ................. G06F 13/4239
710/33

(Continued)

OTHER PUBLICATIONS

Anonymous, "14.3. Memory-Mapped I/O", Mar. 16, 2014, pp. 1-6, https://web.archive.org/web/20140316170647/http://www.cs.uwm.edu/classes/cs315/Bacon/Lecture/HTML/ch14s03.html (Year: 2014).*

(Continued)

*Primary Examiner* — Christopher D Birkhimer
(74) *Attorney, Agent, or Firm* — F. Chau & Associates, LLC

(57) ABSTRACT

An electronic system includes a host device and a storage device including a first memory device of a volatile type and a second memory device of a nonvolatile type. The first memory device is accessed by the host device through a memory-mapped input-output interface and the second memory device is accessed by the host device through a block accessible interface. The storage device provides a virtual memory region to the host device such that a host-dedicated memory region having a first size included in the first memory device is mapped to the virtual memory region having a second size larger than the first size.

20 Claims, 20 Drawing Sheets

(51) Int. Cl.
*G06F 12/0871* (2016.01)
*G06F 12/0868* (2016.01)
*G06F 12/0804* (2016.01)
*G06F 12/08* (2016.01)
*G06F 12/02* (2006.01)

(58) Field of Classification Search
CPC ........ G06F 2212/7208; G06F 12/0804; G06F 12/0284; G06F 2212/1016; G06F 2212/205; G06F 2212/502; G06F 12/10; G06F 12/08; G06F 2212/1056; G06F 2212/7201; G06F 2212/206; G06F 12/0871
See application file for complete search history.

(56) References Cited

U.S. PATENT DOCUMENTS

| | | | | |
|---|---|---|---|---|
| 6,557,077 | B1* | 4/2003 | Ghosh | G06F 11/1441 711/100 |
| 6,567,899 | B2* | 5/2003 | Ghosh | G06F 11/1441 711/118 |
| 7,653,762 | B1* | 1/2010 | Neuendorffer | G06F 11/348 710/18 |
| 7,673,089 | B2* | 3/2010 | Hinchey | G06F 13/4045 710/300 |
| 7,694,091 | B2 | 4/2010 | Andrewartha et al. | |
| 7,928,990 | B2* | 4/2011 | Jiao | G06T 15/005 345/557 |
| 8,799,614 | B2* | 8/2014 | Mansson | G06F 12/1009 711/171 |
| 9,021,182 | B2* | 4/2015 | Park | G06F 12/0246 711/103 |
| 9,058,274 | B2* | 6/2015 | Samanta | G06F 12/0897 |
| 9,116,800 | B2* | 8/2015 | Post | G06F 12/0292 |
| 9,141,293 | B2* | 9/2015 | Nakata | G06F 3/0611 |
| 9,292,204 | B2* | 3/2016 | Samanta | G06F 11/1092 |
| 9,436,597 | B1* | 9/2016 | Karamcheti | G06F 12/06 |
| 9,575,758 | B2* | 2/2017 | Robertson | G06F 9/30054 |
| 9,626,108 | B2* | 4/2017 | Stabrawa | G06F 3/0647 |
| 9,697,116 | B2* | 7/2017 | Kim | G06F 11/1471 |
| 9,772,942 | B2* | 9/2017 | Bahali | G06F 12/0868 |
| 9,811,276 | B1* | 11/2017 | Taylor | G06F 3/0685 |
| 9,817,756 | B1 | 11/2017 | Jorgensen | |
| 9,824,041 | B2* | 11/2017 | Weber | G06F 12/0866 |
| 9,836,217 | B2* | 12/2017 | Stabrawa | G06F 3/0647 |
| 9,841,902 | B2 | 12/2017 | Baderdinni et al. | |
| 9,875,329 | B1* | 1/2018 | Todi | G06F 30/39 |
| 9,934,151 | B2* | 4/2018 | Kan | G06F 3/061 |
| 10,019,172 | B2* | 7/2018 | Mitkar | G06F 3/065 |
| 10,037,277 | B2* | 7/2018 | Feldman | G06F 12/0897 |
| 2002/0194440 | A1* | 12/2002 | Ghosh | G06F 11/1441 711/156 |
| 2006/0004957 | A1* | 1/2006 | Hand, III | G06F 12/0866 711/113 |
| 2007/0211551 | A1* | 9/2007 | Yogev | G11C 5/14 365/226 |
| 2007/0255889 | A1* | 11/2007 | Yogev | G06F 12/0246 711/103 |
| 2008/0074430 | A1* | 3/2008 | Jiao | G06T 15/005 345/506 |
| 2008/0082714 | A1* | 4/2008 | Hinchey | G06F 13/4045 710/300 |
| 2008/0104291 | A1* | 5/2008 | Hinchey | G06F 13/4045 710/74 |
| 2008/0147935 | A1* | 6/2008 | Hinchey | G06F 13/4045 710/74 |
| 2010/0017578 | A1* | 1/2010 | Mansson | G06F 12/023 711/171 |
| 2012/0185644 | A1* | 7/2012 | Kaneko | G06F 3/061 711/114 |
| 2013/0073799 | A1* | 3/2013 | Abe | G06F 12/0246 711/103 |
| 2013/0086308 | A1* | 4/2013 | Nakata | G06F 3/0611 711/103 |
| 2014/0344523 | A1* | 11/2014 | Samanta | G06F 12/084 711/130 |
| 2014/0351523 | A1* | 11/2014 | Samanta | G06F 12/0871 711/130 |
| 2015/0046670 | A1* | 2/2015 | Kim | G06F 11/1471 711/207 |
| 2015/0081998 | A1* | 3/2015 | Post | G06F 3/0661 711/173 |
| 2015/0199128 | A1* | 7/2015 | Park | G06F 12/0246 711/103 |
| 2016/0077761 | A1* | 3/2016 | Stabrawa | G06F 3/067 711/172 |
| 2016/0077966 | A1* | 3/2016 | Stabrawa | G06F 3/0683 711/172 |
| 2016/0344834 | A1 | 11/2016 | Das | |
| 2017/0097770 | A1* | 4/2017 | Mitkar | G06F 3/0659 |
| 2017/0160953 | A1* | 6/2017 | Hirata | G11C 16/10 |
| 2017/0168937 | A1* | 6/2017 | Bahali | G06F 12/0804 |
| 2017/0177541 | A1 | 6/2017 | Berman et al. | |
| 2017/0192902 | A1* | 7/2017 | Hwang | G06F 12/0246 |
| 2017/0212835 | A1 | 7/2017 | Hu et al. | |
| 2017/0270041 | A1 | 9/2017 | Talagala et al. | |
| 2017/0285997 | A1* | 10/2017 | Stabrawa | G06F 3/0604 |
| 2017/0329554 | A1* | 11/2017 | Voigt | G06F 3/0611 |
| 2018/0018171 | A1 | 1/2018 | Amidi et al. | |
| 2018/0060231 | A1* | 3/2018 | Kelly | G06F 12/0868 |
| 2018/0107596 | A1* | 4/2018 | Kelly | G06F 9/3004 |
| 2018/0113614 | A1 | 4/2018 | Lee et al. | |

OTHER PUBLICATIONS

Anonymous, "Memory Mapping and DMA", Jan. 21, 2005, pp. 412-463, https://static.lwn.net/images/pdf/LDD3/ch15.pdf (Year: 2005).*
Blrfl, "How data is accessed in Memory-Mapped I/O?", May 31, 2017, pp. 1-3, https://softwareengineering.stackexchange.com/questions/349902/how-data-is-accessed-in-memory-mapped-i-o (Year: 2017).*
Nima Honarmand, "I/O Devices", 2017, pp. 1-28, https://compas.cs.stonybrook.edu/~nhonarmand/courses/fa17/cse306/slides/14-devices.pdf (Year: 2017).*
Margaret Rouse, "non-volatile memory (NVM)", Jul. 2017, pp. 1-5, https://searchstorage.techtarget.com/definition/nonvolatile-memory (Year: 2017).*
Webopedia, "flash memory", Mar. 4, 2008, pp. 1-2, https://web.archive.org/web/20080304005446/https://www.webopedia.com/TERM/F/flash_memory.html (Year: 2008).*
Webopedia, "Random Access Memory (RAM) Definition & Meaning", Apr. 21, 2008, pp. 1-3, https://web.archive.org/web/20080421040525/https://www.webopedia.com/TERM/R/RAM.html (Year: 2008).*
Filemaker, "Hard Drive Knowledge: Blocks vs. Sectors", Nov. 28, 2013, pp. 1-4, http://www.alphaurax-computer.com/computer-tips/hard-drive-knowledge-blocks-vs-sectors#:~:text=On%20hard%20drives%20and%20floppies,that%20a%20block%20will%20hold. (Year: 2013).*
Webopedia, "block", Mar. 4, 2008, pp. 1-3, https://web.archive.org/web/20080304153306/https://www.webopedia.com/TERM/B/block.html (Year: 2008).*

* cited by examiner

| LBAD | LBA1 | | LBA2 | | LBA3 | | ... | LBAq | |
|------|------|------|------|------|------|------|------|------|------|
| VAD | VA1 | VA2 | VA3 | VA4 | VA5 | VA6 | ... | VAn-1 | VAn |
| OCS | OC | OC | OC | UO | UO | UO | ... | UO | UO |

SMT

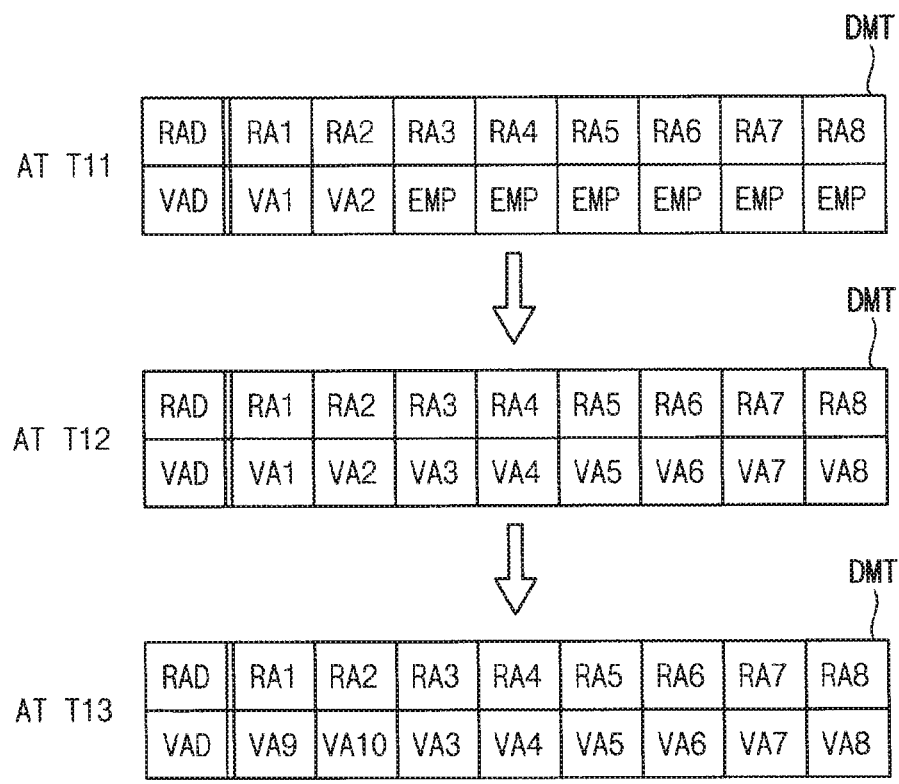

FIG. 13

| AC0 | 1 | 2 | 3 | 4 | 5 | 6 | 7 | 8 | 9 | 10 | 11 | ... |
|-----|---|---|---|---|---|---|---|---|---|----|----|-----|
| VAD | VA3 | VA7 | VA2 | VA9 | VA3 | VA6 | VA5 | VA2 | VA1 | VA4 | VA8 | ... |

| RAD | RA1 | RA2 | RA3 | RA4 | RA5 | RA6 | RA7 | RA8 |
|---|---|---|---|---|---|---|---|---|
| VAD | VA3 | VA7 | EMP | EMP | EMP | EMP | EMP | EMP |
| ACO | 1 | 2 | EMP | EMP | EMP | EMP | EMP | EMP |

⇩ DMT

AT T42

| RAD | RA1 | RA2 | RA3 | RA4 | RA5 | RA6 | RA7 | RA8 |
|---|---|---|---|---|---|---|---|---|
| VAD | VA3 | VA7 | VA2 | VA9 | EMP | EMP | EMP | EMP |
| ACO | 5 | 2 | 3 | 4 | EMP | EMP | EMP | EMP |

⇩ DMT

AT T43

| RAD | RA1 | RA2 | RA3 | RA4 | RA5 | RA6 | RA7 | RA8 |
|---|---|---|---|---|---|---|---|---|
| VAD | VA3 | VA7 | VA2 | VA9 | VA6 | VA5 | EMP | EMP |
| ACO | 5 | 2 | 8 | 4 | 6 | 7 | EMP | EMP |

⇩ DMT

AT T44

| RAD | RA1 | RA2 | RA3 | RA4 | RA5 | RA6 | RA7 | RA8 |
|---|---|---|---|---|---|---|---|---|
| VAD | VA3 | VA7 | VA2 | VA9 | VA6 | VA5 | VA1 | VA4 |
| ACO | 5 | 2 | 8 | 4 | 6 | 7 | 9 | 10 |

⇩ DMT

AT T45

| RAD | RA1 | RA2 | RA3 | RA4 | RA5 | RA6 | RA7 | RA8 |
|---|---|---|---|---|---|---|---|---|
| VAD | VA3 | VA8 | VA2 | VA9 | VA6 | VA5 | VA1 | VA4 |
| ACO | 5 | 11 | 8 | 4 | 6 | 7 | 9 | 10 |

FIG. 17

| OPCODE(07) | OPCODE(06:02) | OPCODE(01:00) | OPCODE | O/M | COMMAND |
|---|---|---|---|---|---|
| COMMAND TYPE | FUNCTION | DATA TRANSFER | | | |
| 0b | 000 00b | 00b | 00h | M | FL |
| 0b | 000 00b | 01b | 01h | M | WR |
| 0b | 000 00b | 10b | 02h | M | RD |
| 0b | 000 01b | 00b | 04h | O | WU |
| 0b | 000 01b | 01b | 05h | O | CP |
| 0b | 000 10b | 00b | 08h | O | WZ |
| 0b | 000 10b | 01b | 09h | O | DM |
| ... | ... | ... | ... | ... | RESERVED |

STORAGE DEVICE PROVIDING A VIRTUAL MEMORY REGION, ELECTRONIC SYSTEM INCLUDING THE SAME, AND METHOD OF OPERATING THE SAME

CROSS-REFERENCE TO RELATED APPLICATION

This U.S. non-provisional application claims priority under 35 U.S.C. § 119 to Korean Patent Application No. 10-2018-0090124, filed on Aug. 2, 2018 in the Korean Intellectual Property Office (KIPO), the disclosure of which is incorporated by reference herein in its entirety.

TECHNICAL FIELD

Exemplary embodiments of the inventive concept relate generally to semiconductor integrated circuits, and more particularly, to a storage device providing a virtual memory region, an electronic system including the storage device, and a method of operating the electronic system.

DISCUSSION OF RELATED ART

Generally, embedded systems may, for example, use volatile memory such as dynamic random access memory (DRAM) as main memory to run software, and nonvolatile memory such as NAND flash memory to store user data. DRAM provides comparably fast read and write speed and enables byte-access. However, because DRAM is volatile memory, power consumption may be substantially large due to the requirement of regular refreshing processes. Accordingly, DRAM is generally used to store software read/write (R/W) data. NAND flash memory typically supports input/output (I/O) processing in units of pages (e.g., 2 KB), and thus is generally not used to execute codes or store software R/W data. However, due to characteristics including fast R/W speed in transmitting mass data, low cost, and high capacity, NAND flash memory is generally used to store user data. As such, because various memories are utilized in different ways and have different functionalities, designing a system including these various memories increases design complexity as well as manufacturing cost.

SUMMARY

According to an exemplary embodiment of the inventive concept, an electronic system include a host device and a storage device including a first memory device of a volatile type and a second memory device of a nonvolatile type. The first memory device is accessed by the host device through a memory-mapped input-output interface and the second memory device is accessed by the host device through a block accessible interface The storage device provides a virtual memory region to the host device such that a host-dedicated memory region having a first size included in the first memory device is mapped to the virtual memory region having a second size larger than the first size.

According to an exemplary embodiment of the inventive concept, a storage device includes a first memory device configured to be accessed by a host device through a memory-mapped input-output interface, a second memory device configured to be accessed by the host device through a block accessible interface, and a virtual memory controller. The virtual memory controller provides a virtual memory region to the host device such that a host-dedicated memory region having a first size included in the first memory device is mapped to the virtual memory region having a second size larger than the first size.

According to an exemplary embodiment of the inventive concept, a method of operating an electronic system including a host device and a storage device includes, accessing, by the host device, a first memory device included in the storage device through a memory-mapped input-output interface, accessing, by the host device, a second memory device included in the storage device through a block accessible interface, and providing, by the storage device, a virtual memory region to the host device such that a host-dedicated memory region having a first size included in the first memory device is mapped to the virtual memory region having a second size larger than the first size.

BRIEF DESCRIPTION OF THE DRAWINGS

The above and other features of the inventive concept will be more clearly understood by describing in detail exemplary embodiments thereof with reference to the accompanying drawings.

FIG. 9 is a diagram illustrating an appending write operation in an electronic system according to an exemplary embodiment of the inventive concept.

FIG. 10 is a diagram illustrating mapping relations of the dynamic mapping table according to the appending write operation of FIG. 9 according to an exemplary embodiment of the inventive concept.

FIG. 13 is a diagram illustrating a random write operation in an electronic system according to an exemplary embodiment of the inventive concept.

FIG. 14 is a diagram illustrating mapping relations of the dynamic mapping table according to the random write operation of FIG. 13 according to an exemplary embodiment of the inventive concept.

FIG. 17 is a diagram illustrating example commands of a block accessible interface according to an exemplary embodiment of the inventive concept.

DETAILED DESCRIPTION OF THE EMBODIMENTS

Figure 1:
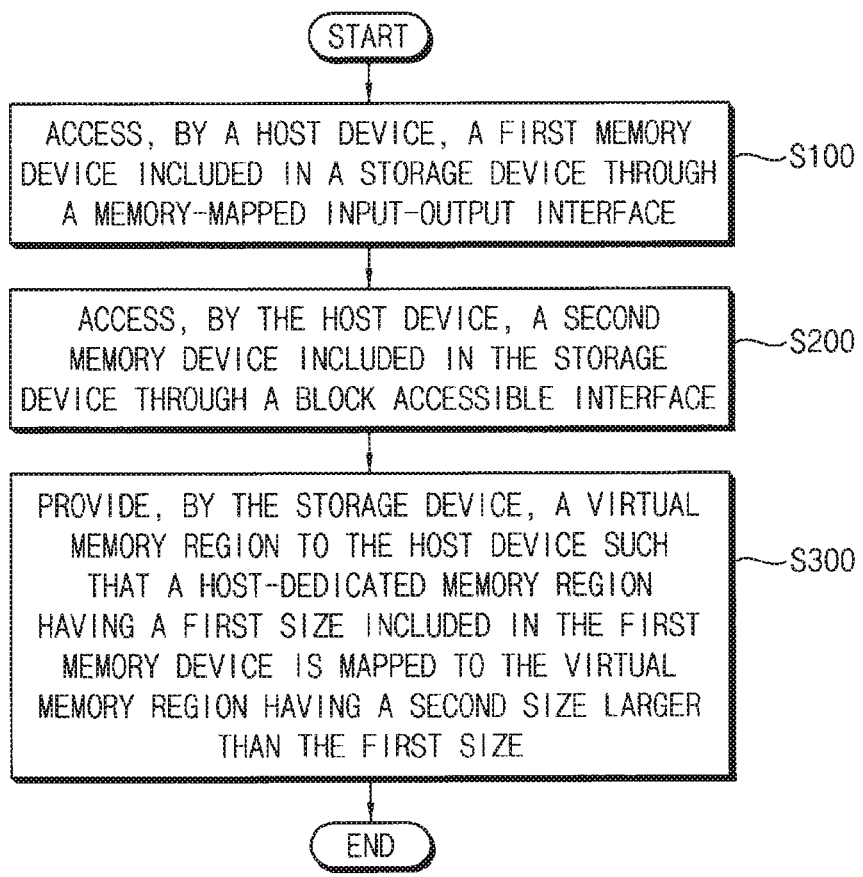
FIG. 1 is a flowchart illustrating a method of operating an electronic system according to an exemplary embodiment of the inventive concept.

Exemplary embodiments of the inventive concept may provide a storage device capable of efficiently providing a memory space to a host device.

Exemplary embodiments of the inventive concept may also provide an electronic system including the storage device and the host device, and a method of operating the electronic system.

Exemplary embodiments of the inventive concept will be described more fully hereinafter with reference to the accompanying drawings. Like reference numerals may refer to like elements throughout this application.

Figure 2:
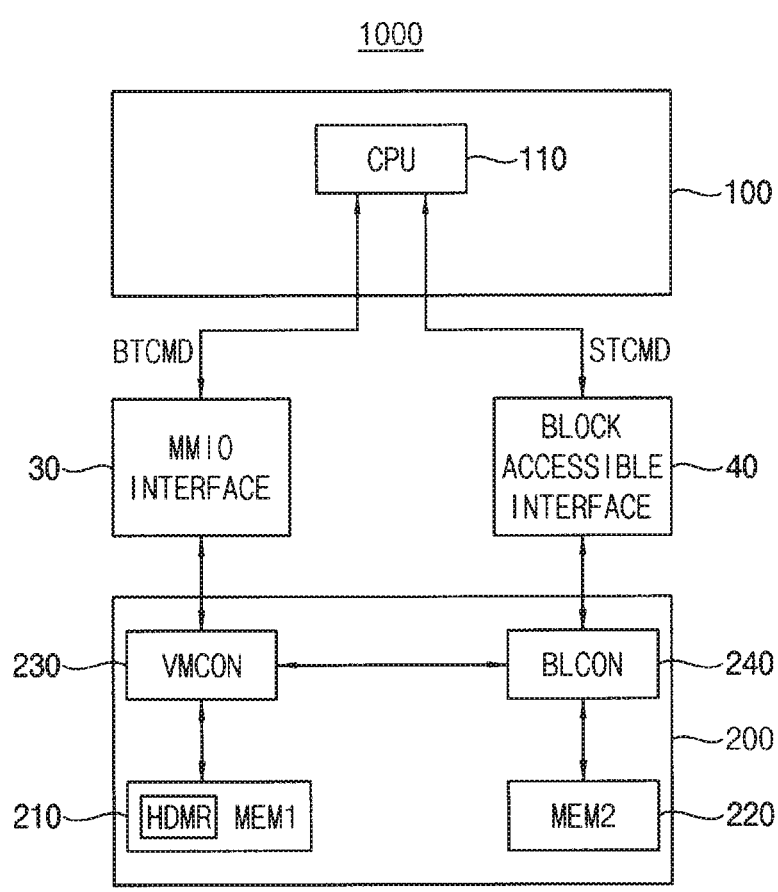
FIG. 2 is a block diagram illustrating an electronic system according to an exemplary embodiment of the inventive concept.

FIG. 1 is a flowchart illustrating a method of operating an electronic system according to an exemplary embodiment of the inventive concept, and FIG. 2 is a block diagram illustrating an electronic system according to an exemplary embodiment of the inventive concept.

Referring to FIGS. 1 and 2, a host device 100 accesses a first memory device MEM1 210 included in a storage device 200 through a memory-mapped input-output (MMIO) interface 30 (S100). In addition, the host device 100 accesses a second memory device MEM2 220 included in the storage device 200 through a block accessible interface 40 (S200). The storage device 200 provides a virtual memory region to the host device 100 such that a host-dedicated memory region having a first size included in the first memory device MEM1 210 is mapped to the virtual memory region having a second size larger than the first size (S300).

As will be described below with reference to FIGS. 3, 4, and 5, the storage device 200 may generate a dynamic mapping table DMT including mapping relations between real addresses RA1~RAm of a host-dedicated memory region HDMR and virtual addresses VA1~VAn of a virtual memory region VMR, and dynamically change the mapping relations of the dynamic mapping table DMT according to progression of an access operation by the host device 100 with respect to the virtual memory region VMR. As such, the virtual memory region VMR having a larger size than the host-dedicated memory region HDMR corresponding to real memory resources may be provided by dynamically changing the mapping relations between the host-dedicated memory region HDMR and the virtual memory region VMR to reduce a size and enhance performance of the storage device 200 and an electronic system 1000 including the storage device 200.

As will be described below with reference to FIGS. 3, 6, and 7, the host device 100 may generate a static mapping table SMT including mapping relations between the virtual addresses VA1~VAn of the virtual memory region VMR and logic block addresses LBA1~LBAn of a flushing memory region FMR having the second size included in the second memory device MEM2 220, and provide the static mapping table SMT to the storage device 200. As such, the host device 100 and the storage device 200 may share the static mapping table SMT to efficiently support access in units of bytes and access in units of blocks between the host device and the storage device.

As will be described below with reference to FIGS. 9 through 15, the storage device 200 may set a persistent memory region PMR including a plurality of flushing units FU1 and FU2 with respect to the host-dedicated memory region HDMR, and perform a flushing operation to store data of one flushing unit of the plurality of flushing units FU1 and FU2 in the second memory device MEM2 220 when a write operation with respect to the one flushing unit is completed. As such, nonvolatility of the virtual memory region VMR may be supported through the flushing operation, and access in units of bytes and access in units of blocks between the host device and the storage device may be supported efficiently to enhance performance of the storage device 200 and the electronic system 1000.

Referring to FIG. 2, the electronic system 1000 includes the host device 100 and the storage device 200. The host device 100 may include at least one processor 110 such as a central processing unit (CPU). The storage device 200 may include the first memory device MEM1 210, the second memory device MEM2 220, a virtual memory controller VMCON 230, and a block controller BLCON 240.

The processor 110 may generate the static mapping table SMT as will be described with reference to FIGS. 3, 6, and 7. The processor 110 may, based on the mapping information of the static mapping table SMT, generate a byte access command BTCMD to access the first memory device MEM1 210 and a block access command STCMD to access the second memory device MEM2 220.

The processor 110 may, based on occupation state information OCS of the static mapping table SMT, determine whether data are stored at the logic block address LBA of the second memory device MEM2 220 that is mapped to the virtual address VA of the virtual memory region VMR, and the processor 110 may, based on the determination, selectively perform access in units of bytes with respect to the first memory device MEM1 210 or access in units of blocks with respect to the second memory device MEM2 220.

The virtual memory controller 230 may receive the byte access command BTCMD through the MMIO interface 30. The virtual memory controller 230 may perform access in units of bytes with respect to the first memory device MEM1 210 based on the byte access command BTCMD.

The block controller 240 may receive the block access command STCMD through the block accessible interface 40. The block controller 240 may perform access in units of blocks based on the block access command STCMD.

In addition, the virtual memory controller 230 and the block controller 240 may perform an internal data transfer between the first memory device MEM1 210 and the second memory device MEM2 220. The internal data transfer may include a flushing operation corresponding to a data transfer from the first memory device MEM1 210 to the second memory device MEM2 220 and a loading operation corresponding to a data transfer from the second memory device MEM2 220 to the first memory device MEM1 210, which will be described below.

Each of the MMIO interface 30 and the block accessible interface 40 may be implemented with hardware such as a bus system, software such as drive program, or a combination of hardware and software.

In exemplary embodiments of the inventive concept, the first memory device MEM1 210 of the storage device 200 may be connected to the processor 110 of the host device 100 through the MMIO interface 30 which may include, for example, a peripheral component interconnect-express (PCIe) bus or the like. The virtual memory controller 230 of the storage device 200 may use a byte accessible address space of a larger size than the host-dedicated memory region HDMR to provide the MMIO interface 30 to the host device 100, for allowing access in units of bytes with respect to the data stored in the host-dedicated memory region HDMR. In other words, the virtual memory region VMR provided to the host device 100 may have a larger size than the host-dedicated memory region HDMR.

In exemplary embodiments of the inventive concept, the second memory device MEM2 220 of the storage device 200 may be connected to the processor 110 of the host device 100 through the block accessible interface 40 which may include for example a serial advanced technology attachment (SATA) bus, a nonvolatile memory express (NVMe) bus, a serial attached SCSI (SAS) bus, or the like. The storage device 200 may use a block accessible address space corresponding to an access size of the second memory device MEM2 220 to provide the block accessible interface 40 to the host device 100, for allowing access in units of blocks with respect to the data stored in the second memory device MEM2 220.

The first memory device MEM1 210 may be an arbitrary memory device that may be accessed by the host device 100 through the MMIO interface 30. For example, the first memory device MEM1 210 may be a volatile memory device having a rapid operation speed such as dynamic random access memory (DRAM), static random access memory (SRAM), or the like.

The second memory device MEM2 220 may be an arbitrary memory device that may be accessed by the host device 100 through the block accessible interface 40. For example, the second memory device MEM2 220 may be a nonvolatile memory device such as electrically erasable programmable read only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), or the like.

Figure 3:
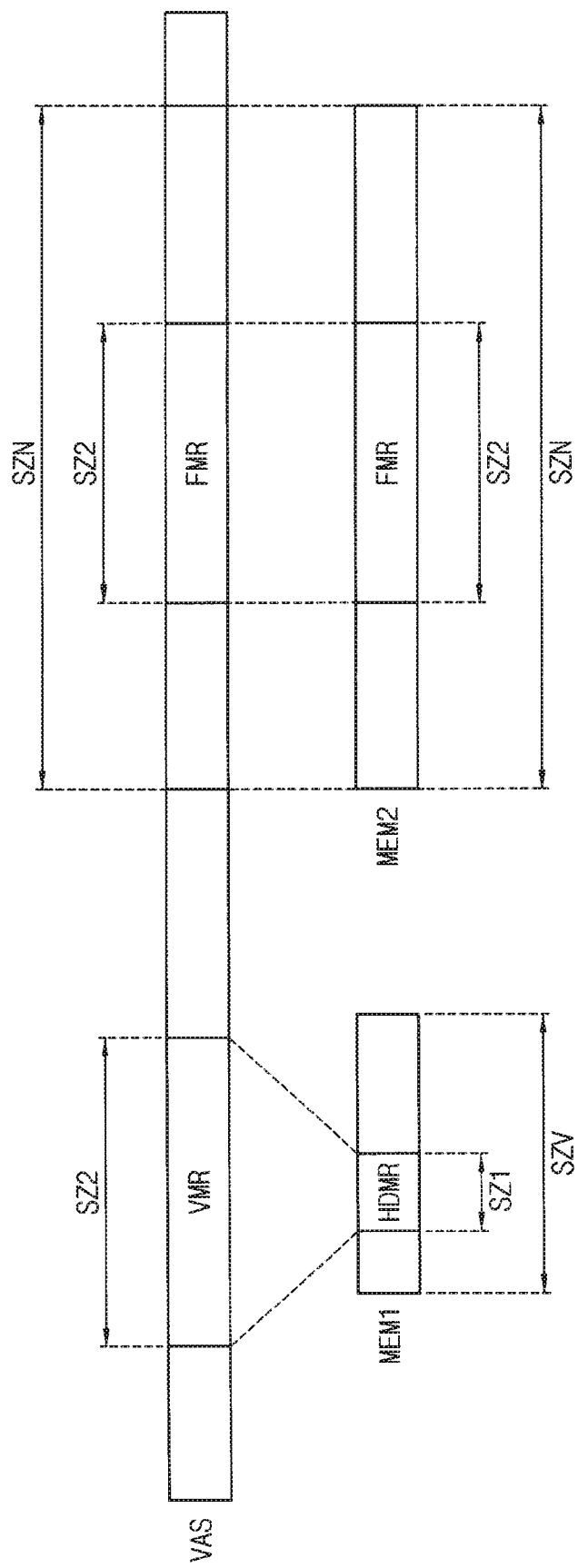
FIG. 3 is a diagram illustrating address mapping in an electronic system according to an exemplary embodiment of the inventive concept.

FIG. 3 is a diagram illustrating address mapping in an electronic system according to an exemplary embodiment of the inventive concept.

Referring to FIG. 3, a virtual address space VAS of the host device 100 may include a virtual memory region VMR and a flushing memory region FMR.

The virtual memory region VMR is mapped to the host-dedicated memory region HDMR of the first memory device MEM1 210. The host-dedicated memory region HDMR may be a portion of the first memory device MEM1 210. In other words, a first size SZ1 of the host-dedicated memory region HDMR may be smaller than a size SZV of the first memory device MEM1 210. Here, a size indicates a data storage capacity or a memory capacity.

The host-dedicated memory region HDMR may have the first size SZ1 and the virtual memory region VMR may have a second size SZ2 larger than the first size SZ1. To provide the virtual memory region VMR having the larger size than the host-dedicated memory region HDMR corresponding to real memory resources, the storage device 200 may dynamically change the mapping relations between the host-dedicated memory region HDMR and the virtual memory region VMR.

The second memory device MEM2 220 may provide an address space of the same size SZN as the second memory device MEM2 220 to the host device 100. The flushing memory region FMR mapped to the virtual memory region VMR may be a portion of the second memory device MEM2 220. In other words, the second size SZ2 of the flushing memory region FMR may be smaller than the size SZN of the second memory device MEM2 220.

The virtual memory region VMR and the flushing memory region FMR may have the same size, e.g., the second size SZ2. The host device 100 may set the mapping relations between the virtual memory region VMR and the flushing memory region FMR statically without change because they have the same size.

Figure 4:
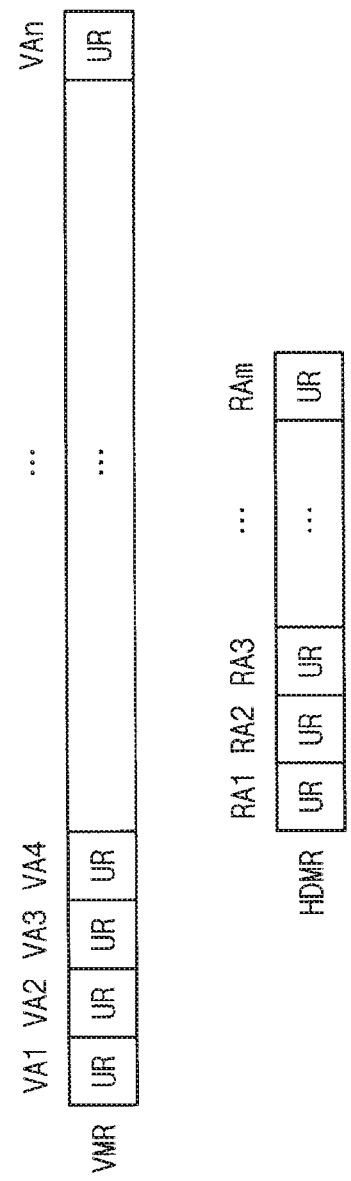
FIG. 4 is a diagram illustrating a virtual memory region and a host-dedicated memory region in an electronic system according to an exemplary embodiment of the inventive concept.

FIG. 4 is a diagram illustrating a virtual memory region and a host-dedicated memory region in an electronic system according to an exemplary embodiment of the inventive concept.

Referring to FIG. 4, the virtual memory region VMR and the host-dedicated memory region HDMR may be divided into a plurality of unit regions UR having the same size. The virtual addresses VA1~VAn may be assigned to the unit regions UR of the virtual memory region VMR and the real addresses RA1~RAm may be assigned to the unit regions UR of the host-dedicated memory region HDMR. For example, each of the virtual addresses VA1~VAn and the real addresses RA1~RAm may be a start address of a corresponding unit region UR.

The size of the unit region UR may be determined variously according to characteristic and/or operation scenario of the electronic system. In exemplary embodiments of the inventive concept, as illustrated in FIG. 6, one virtual address may correspond to one logic block address and the size of the unit region UR may correspond to a size of a data block of the second memory device MEM2 220. In exemplary embodiments of the inventive concept, as illustrated in FIG. 7, two virtual addresses may correspond to one logic block address and the size of the unit region UR may correspond to a half size to the data block of the second memory device MEM2 220.

Figures 5, 6:
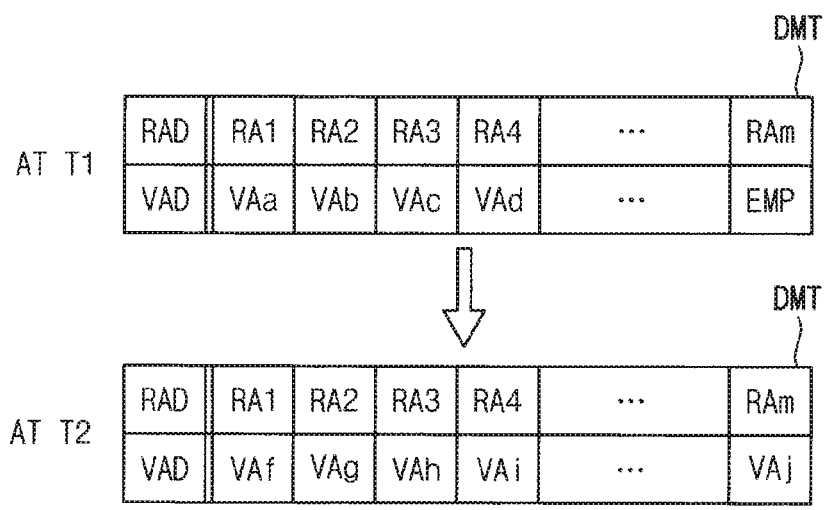
FIG. 5 is a diagram illustrating a dynamic mapping table in an electronic system according to an exemplary embodiment of the inventive concept.
FIGS. 6 and 7 are diagrams illustrating a static mapping table in an electronic system according to exemplary embodiments of the inventive concept.

FIG. 5 is a diagram illustrating a dynamic mapping table in an electronic system according to an exemplary embodiment of the inventive concept.

Referring to FIG. 5, the dynamic mapping table DMT may include mapping relations between real address RAD of the host-dedicated memory region HDMR and virtual address VAD of the virtual memory region VMR.

For example, at time point T1, the real addresses RA1, RA2, RA2, and RA4 may be mapped to the virtual addresses VAa, VAb, VAc, and VAd, respectively. 'EMP' indicates that a corresponding real address is not mapped to a virtual address. For example, FIG. 5 indicates that a virtual address is not mapped to the real address RAm.

Such mapping relations between the real address RAD and the virtual address VAD may be changed according to progression of an access operation by the host device 100 with respect to the virtual memory region VMR. For example, at time point T2 different from time point T1, the real addresses RA1, RA2, RA2, RA4, and RAm may be mapped to the virtual addresses VAf, VAg, Vah, VAi, and VAj, respectively.

The dynamic mapping table DMT at time point T1 indicates the mapping relations between virtual addresses and the corresponding real addresses that are accessed most recently from time point T1, and similarly, the dynamic mapping table DMT at time point T2 indicates the mapping relations between virtual addresses and the corresponding real addresses that are accessed most recently from time point T2.

As such, the storage device 200 may provide the virtual memory region VMR having the larger size than the host-dedicated memory region HDMR corresponding to real memory resources by dynamically changing the mapping relations between the host-dedicated memory region HDMR and the virtual memory region VMR to reduce a size and enhance performance of the storage device 200 and the electronic system 1000 including the storage device 200.

Figures 7, 8:
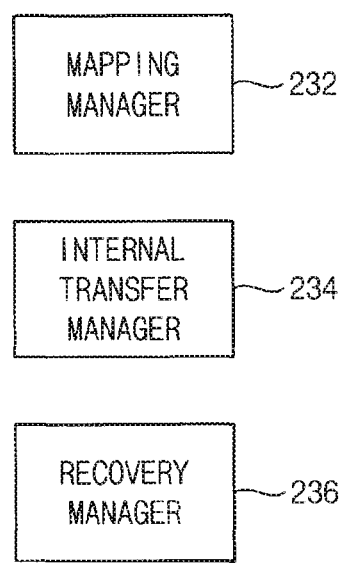
FIG. 8 is a block diagram illustrating a virtual memory controller included in a storage device according to an exemplary embodiment of the inventive concept.

FIGS. 6 and 7 are diagrams illustrating a static mapping table in an electronic system according to exemplary embodiments of the inventive concept.

Referring to FIGS. 6 and 7, the static mapping table SMT may include mapping relations between the virtual address VAD of the virtual memory region VMR and logic block address LBAD of the flushing memory region FMR. In additions, the static mapping table SMT may further include occupation state information OCS indicating whether data are stored at each logic block address LBAD that is mapped to a corresponding virtual address VAD. The occupation state information OCS may have a first value OC when data are stored at the logic block address LBA mapped to the virtual address VAD and a second value UO data are not stored at the logic block address LBA.

In exemplary embodiments of the inventive concept, as illustrated in FIG. 6, one virtual address VAD may correspond to one logic block address LBAD. In other words, the virtual addresses VA1, VA2, VA3, and VAn may be mapped to the logic block addresses LBA1, LBA2, LBA3, and LBAn, respectively. In this case, the size of the unit region UR may correspond to a size of a data block of the second memory device MEM2 220. In the example of FIG. 6, the occupation state information OCS indicates that data are stored at the logic block addresses LBA1 and LBA2 mapped to the virtual addresses VA1 and VA2 corresponding to the first value OC and data are not stored at the logic block addresses LBA3 and LBAn mapped to the virtual addresses VA3 and VAn corresponding to the second value UO.

In exemplary embodiments of the inventive concept, as illustrated in FIG. 7, two virtual addresses may correspond to one logic block address. In other words, the virtual addresses VA1 and VA2 may be mapped to the logic block address LBA1, the virtual addresses VA3 and VA4 may be mapped to the logic block address LBA2, the virtual addresses VA5 and VA6 may be mapped to the logic block address LBA3, and the virtual addresses VAn-1 and VAn may be mapped to the logic block address LBAq. In this case, n corresponds to 2q and the size of the unit region UR may correspond to a half size of the data block of the second memory device MEM2 220. In the example of FIG. 7, the occupation state information OCS indicates that data are stored at the logic block address LBA1 mapped to the virtual addresses VA1 and VA2 corresponding to the first value OC, data are not stored at the logic block addresses LBA3 and LBAq mapped to the virtual addresses VA5, VA6, VAn-1, and VAn corresponding to the second value UO, and data are stored in a portion of a data block at the logic block address LBA2 mapped to the virtual addresses VA3 and VA4 corresponding to the first value OC and the second value UO, respectively.

The static mapping table SMT may be generated by the host device 100 and may be provided to the storage device 200 from the host device 100. As such, the host device 100 and the storage device 200 may share the static mapping table SMT to efficiently support access in units of bytes and access in units of blocks between the host device 100 and the storage device 200.

FIG. 8 is a block diagram illustrating a virtual memory controller included in a storage device according to an exemplary embodiment of the inventive concept.

Referring to FIG. 8, a virtual memory controller 230 may include a mapping manager 232, an internal transfer manager 234, and a recovery manager 236.

The mapping manager 232 may generate the dynamic mapping table DMT including mapping relations between the real addresses RA1~RAm of the host-dedicated memory region HDMR and the virtual addresses VA1~VAn of the virtual memory region VMR. As described with reference to FIG. 5, the mapping manager 232 may dynamically change the mapping relations of the dynamic mapping table DMT according to progression of an access operation by the host device 100 with respect to the virtual memory region VMR.

The internal transfer manager 234 may control a data transfer between the first memory device MEM1 210 and the second memory device MEM2 220 based on the dynamic mapping table DMT and the static mapping table SMT including the mapping relations between the virtual addresses VA1~VAn of the virtual memory region VMR and the logic block addresses LBA1~LBAn of the flushing memory region FMR and the occupation state information OCS indicating whether data are stored at each logic block address that is mapped to a corresponding virtual address.

The internal data transfer may include a flushing operation corresponding to a data transfer from the first memory device MEM1 210 to the second memory device MEM2 220 and a loading operation corresponding to a data transfer from the second memory device MEM2 220 to the first memory device MEM1 210, as will be described below.

The mapping manager 232 and the internal transfer manager 234 may be implemented with combinations of an address translation unit (ATU), a memory management unit (MMU), a multiplexer for data redirection, etc.

The recovery manager 236 may control operations for supporting nonvolatility or persistency of the persistent memory region PMR that is set with respect to the host-dedicated memory region HDMR as will be described with reference to FIG. 11. The recovery manager 236 may be implemented with a combination of a power loss protection (PLP) circuit and software to control the PLP circuit as will be described below. The recovery manager 236 may perform a backup operation to store data in the persistent memory region PMR into the flushing memory region FMR of the second memory device MEM2 220, which is the nonvolatile type, using auxiliary power, when an interrupt occurs in input power provided to the storage device 200. In addition, the recovery manager 236 may store the static mapping table SMT and the dynamic mapping table DMT into a meta region of the second memory device MEM2 220 in case of the power interrupt.

After the input power is recovered, all of the data in the virtual memory region VMR may be recovered based on the information and the data stored in the second memory device MEM2 220.

FIG. 9 is a diagram illustrating an appending write operation in an electronic system according to an exemplary embodiment of the inventive concept, and FIG. 10 is a diagram illustrating mapping relations of the dynamic mapping table according to the appending write operation of FIG. 9 according to an exemplary embodiment of the inventive concept.

Referring to FIG. 9, the host device 100 may perform an appending write operation to store data in the virtual memory region VMR with the virtual address VAD that is sequentially increased. In FIG. 9, 'ACO' indicates a write order.

FIG. 10 illustrates a change of the mapping relations of the dynamic mapping table DMT corresponding to the appending write operation of FIG. 9. FIG. 10 illustrates an example where the host-dedicated memory region HDMR corresponds to the eight real addresses RA1~RA8 for convenience of illustration and description, but the inventive concept is not limited thereto.

At time point T11, the dynamic mapping table DMT indicates that the first and second virtual addresses VA1 and VA2 are mapped sequentially to the first and second real addresses RA1 and RA2, and the virtual addresses are not mapped (EMP) yet to the third through eighth real addresses RA3~RA8.

At time point T12 after the time point T11, the dynamic mapping table DMT indicates that the first through eighth virtual addresses VA1~VA8 are mapped sequentially to all of the first through eighth real addresses RA1~RA8.

At time T13 after the write operation is performed with respect to the ninth and tenth virtual addresses VA9 and VA10, the ninth and tenth virtual addresses VA9 and VA10 are sequentially mapped to the first and second real addresses RA1 and RA2.

As such, the virtual addresses VA1~VAn may be mapped dynamically to the real addresses RA1~RAm (where n>m) by a rotation scheme or a round robin scheme. Through such dynamic mapping, the virtual memory region VMR having the second size SZ2 larger than the first size SZ1 may be provided to the host device 100 using the host-dedicated memory region HDMR having the first size SZ1.

Figure 11:
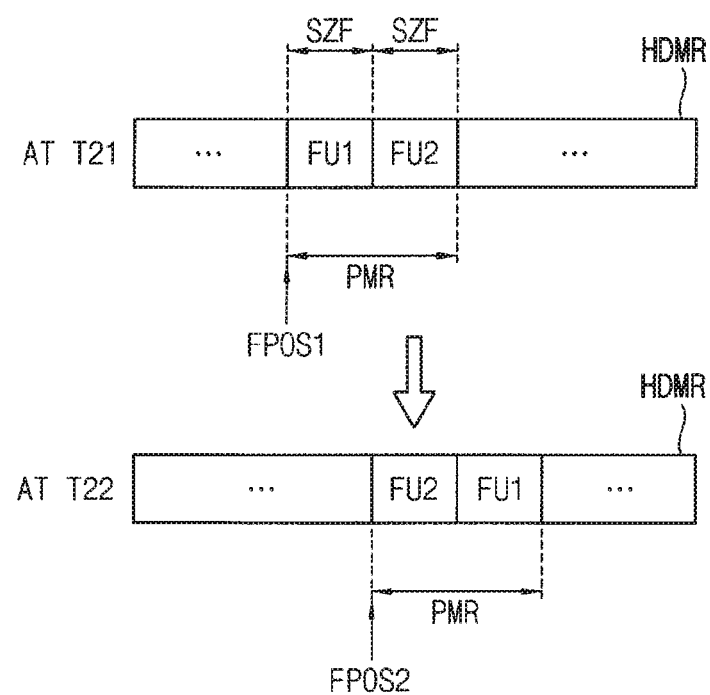
FIG. 11 is a diagram illustrating setting of a persistent memory region according to the appending write operation of FIG. 9 according to an exemplary embodiment of the inventive concept.

FIG. 11 is a diagram illustrating setting of a persistent memory region according to the appending write operation of FIG. 9 according to an exemplary embodiment of the inventive concept.

Referring to FIG. 11, the storage device 200 may set the persistent memory region PMR including a plurality of flushing units FU1 and FU2 with respect to the host-dedicated memory region HDMR. FIG. 11 illustrates an example where the persistent memory region PMR includes the two flushing units FU1 and FU2 for convenience of illustration and description, but the inventive concept is not limited thereto. For example, the persistent memory region PMR may include three or more flushing units.

The storage device 200 may perform a flushing operation to store data of one flushing unit of the plurality of flushing units FU1 and FU2 into the second memory device MEM2 220 when a write operation with respect to the one flushing unit is completed. For example, the internal transfer manager 234 included in the virtual memory controller 230 of FIG. 8 may store the data in the one flushing unit into a corresponding portion of the flushing memory region FMR of the first memory device MEM1 210 based on the static mapping table SMT and the dynamic mapping table DMT.

The internal transfer manager 234 may increase a flushing position corresponding to a start position of the persistent memory region PMR by a flushing size SZF of each of the flushing units FU1 and FU2 starting from a start address of the host-dedicated memory region HDMR whenever the flushing operation with respect to each flushing unit is completed. FIG. 11 illustrates the flushing position FPOS1 at time point T21 and the flushing position FPOS2 at time point T22 after the flushing operation with respect to the one flushing unit FU1 is completed.

The persistent memory region PMR may be changed dynamically such that the flushing unit for which the flushing operation is completed is excluded from the persistent memory region PMR and a new flushing unit is included in the persistent memory region PMR.

The internal transfer manager 234 may return the flushing position to the start address of the host-dedicated memory region HDMR when the flushing position reaches a last address of the host-dedicated memory region HDMR.

As such, the old data previously written in the host-dedicated memory region HDMR may be already stored in the nonvolatile second memory device MEM2 220 by the flushing operation, and the most recent data in the host-dedicated memory region HDMR may be included in the persistent memory region PMR. Even if the power to the storage device 200 is interrupted or blocked abruptly, the recovery manager 236 described with reference to FIG. 8 may back up the data in the persistent memory region PMR into the flushing memory region FMR of the second memory device MEM2 220 using the auxiliary power.

As a result, the storage device 200 may support nonvolatility or persistency of the virtual memory region VMR such that all of data stored in the virtual memory region VMR are maintained even though the power of the storage device 200 is blocked.

Figure 12:
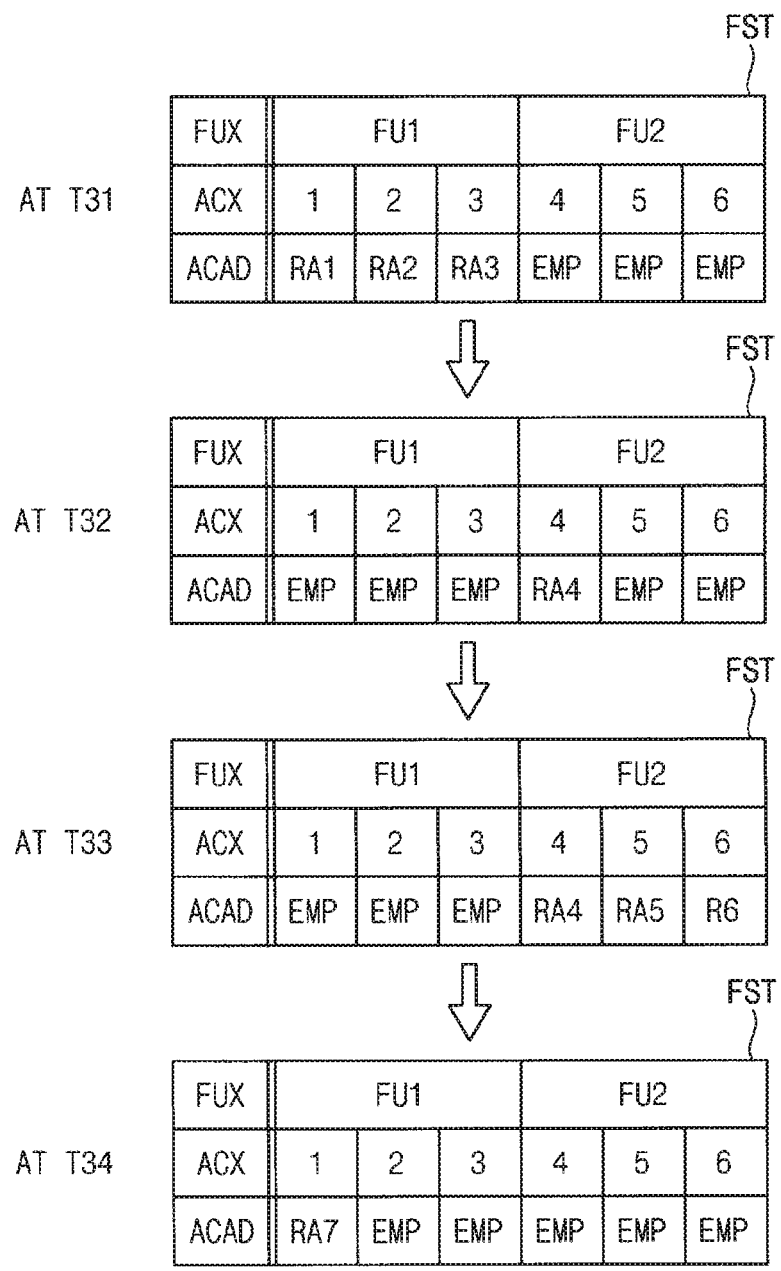
FIG. 12 is a diagram illustrating setting of a persistent memory region according to the appending write operation of FIG. 9 according to an exemplary embodiment of the inventive concept.

FIG. 12 is a diagram illustrating setting of a persistent memory region according to in the appending write operation of FIG. 9 according to an exemplary embodiment of the inventive concept.

Referring to FIG. 12, the internal transfer manager 234 in the storage device 200 may generate a flushing state table FST including mapping relations between the plurality of flushing units FU1 and FU2 and the real addresses at which the appending write operation has been performed. The internal transfer manager 234 may perform the flushing operation based on the flushing state table FST.

In FIG. 12, TUX' indicates an index of the flushing units FU1 and FU2, 'ACX' indicates a write order index, and 'ACAD' indicates the real address corresponding to the write order index ACX. 'EMP' indicates that a corresponding real address is not mapped to a virtual address.

At time point T31, the flushing state table FST indicates that the first, second, and third real addresses RA1, RA2, and RA3 are mapped to the first flushing unit FU1. In other words, the flushing state table FST at time point T31 indicates that the write operation has been completed with respect to the first and second real addresses RA1 and RA2 and the write operation is being performed with respect to the third real address RA3.

After that, the write operation with respect to the third real address RA3 is completed and the write operation begins with respect to the fourth real address RA4. Then, the internal transfer manager 234 performs the flushing operation with respect to the first, second, and third real addresses RA1, RA2, and RA3 that are mapped to the first flushing unit FU1 and deletes the mapping relations of the flushing unit FU1.

As such, the flushing state table FST at time point T32 indicates that the write operation is being performed with respect to the fourth real address RA4, the flushing state table FST at time point T33 indicates that the write operation has been completed with respect to the fourth and fifth real addresses RA4 and RA5 and the write operation is being performed with respect to the sixth real address RA6, and the flushing state table FST at time point T34 indicates that the write operation is being performed with respect to the seventh real address RA7. Whenever the write operation is completed with respect to each of the flushing units FU1 and FU2, the flushing operation may be performed alternately with respect to the first flushing unit FU1 and the second flushing unit FU2.

FIG. 13 is a diagram illustrating a random write operation in an electronic system according to an exemplary embodiment of the inventive concept, and FIG. 14 is a diagram illustrating mapping relations of the dynamic mapping table according to the random write operation of FIG. 13 according to an exemplary embodiment of the inventive concept.

Referring to FIG. 13, the host device 100 may perform a random write operation to store data in the virtual memory region VMR regardless of a sequential order of the virtual address VAD. In FIG. 13, 'ACO' indicates a write order.

FIG. 14 illustrates a change of the mapping relations of the dynamic mapping table DMT corresponding to the random write operation of FIG. 13. As illustrated in FIG. 14, the dynamic mapping table DMT may further include the write order information ACO indicating an order of the real addresses at which the random write operation has been performed. FIG. 14 illustrates an example where the host-dedicated memory region HDMR corresponds to the eight real addresses RA1~RA8 for convenience of illustration and description, but the inventive concept is not limited thereto.

At time point T41, the dynamic mapping table DMT indicates that the third and seventh virtual addresses VA3 and VA7 are mapped sequentially to the first and second real addresses RA1 and RA2, and the virtual addresses are not mapped (EMP) yet to the third through eighth real addresses RA3~RA8.

At time point T42 after the time point T41, the dynamic mapping table DMT indicates that the second and ninth virtual addresses VA2 and VA9 are mapped sequentially to the third and fourth real addresses RA3 and RA4, the additional write operation is performed with respect to the third virtual address VA3, and thus the write order of the first real address RA1 is changed from 1 to 5.

At time T43 after the time point T42, the dynamic mapping table DMT indicates that the sixth and fifth virtual addresses VA6 and VA5 are mapped sequentially to the fifth and sixth real addresses RA5 and RA6, the additional write operation is performed with respect to the second virtual address VA2, and thus the write order of the third real address RA3 is changed from 3 to 8.

At time T44 after the time point T43, the dynamic mapping table DMT indicates that the first and fourth virtual addresses VA1 and VA4 are mapped sequentially to the seventh and eighth real addresses RA7 and RA8.

If the write operation is performed with respect to a new virtual address while all of the real addresses RA1~RA8 are mapped to respective virtual addresses, the new virtual address may be mapped to the real address corresponding to the oldest write order.

For example, at time T45 after the time point T44, the dynamic mapping table DMT indicates that the seventh virtual address VA7 mapped to the second real address RA2 is deleted and the eighth virtual address VA8 to which the write operation is being performed may be newly mapped to the second real address RA2.

As such, the virtual addresses VA1~VAn may be mapped dynamically to the real addresses RA1~RAm (where n>m) using the write order information ACO. Through such dynamic mapping, the virtual memory region VMR having the second size SZ2 larger than the first size SZ1 may be provided to the host device 100 using the host-dedicated memory region HDMR having the first size SZ1.

Figure 15:
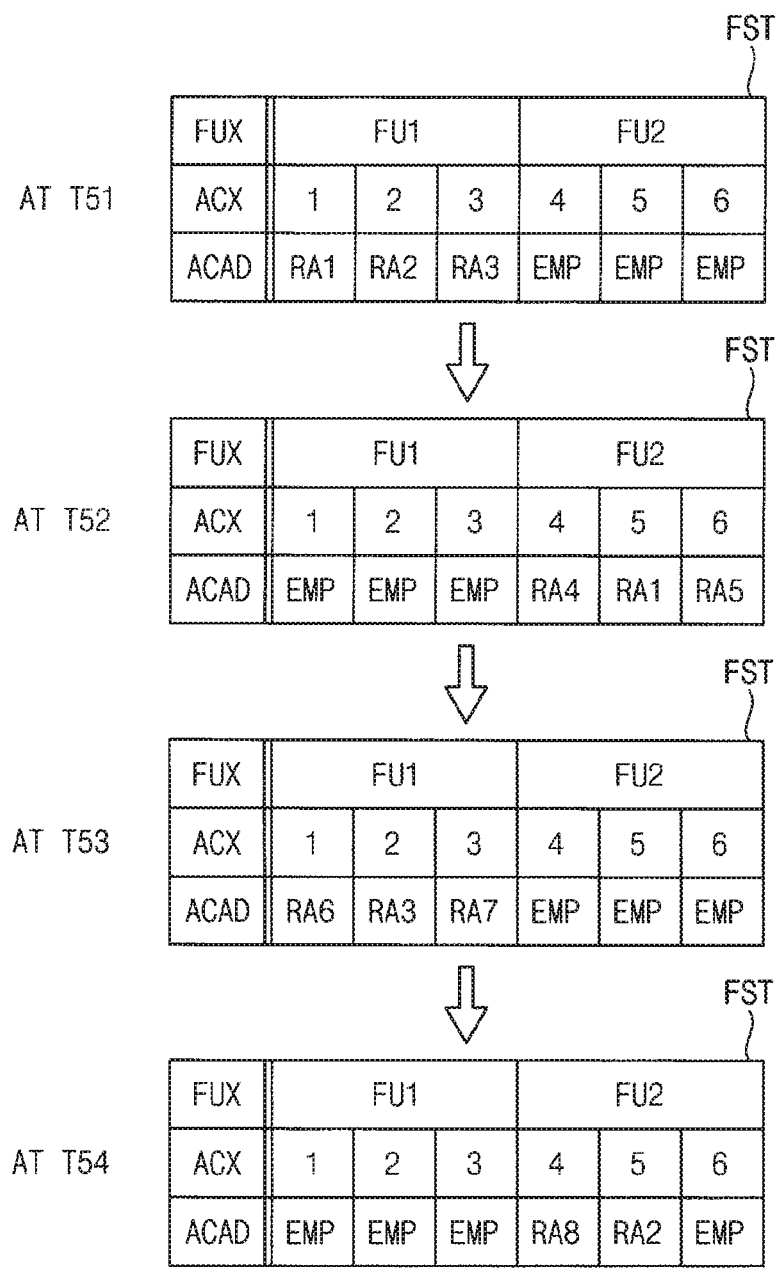
FIG. 15 is a diagram illustrating setting of a persistent memory region according to the random write operation of FIG. 13 according to an exemplary embodiment of the inventive concept.

FIG. 15 is a diagram illustrating setting of a persistent memory region according to the random write operation of FIG. 13 according to an exemplary embodiment of the inventive concept.

Referring to FIG. 15, the internal transfer manager 234 in the storage device 200 may generate the flushing state table FST including mapping relations between the plurality of flushing units FU1 and FU2 and the real addresses at which the random write operation has been performed. The internal transfer manager 234 may perform the flushing operation based on the flushing state table FST.

In FIG. 15, TUX' indicates an index of the flushing units FU1 and FU2, 'ACX' indicates a write order index, and 'ACAD' indicates the real address corresponding to the write order index ACX. 'EMP' indicates that a corresponding real address is not mapped to a virtual address.

At time point T51, the flushing state table FST indicates that the first, second, and third real addresses RA1, RA2, and RA3 are mapped to the first flushing unit FU1. In other words, the flushing state table FST at time point T51 indicates that the write operation has been completed with respect to the first and second real addresses RA1 and RA2 and the write operation is being performed with respect to the third real address RA3.

After that, the write operation with respect to the third real address RA3 is completed and the write operation begins with respect to the fourth real address RA4. Then, the internal transfer manager 234 performs the flushing operation with respect to the first, second, and third real addresses RA1, RA2, and RA3 that are mapped to the first flushing unit FU1 and deletes the mapping relations of the flushing unit FU1.

As such, the flushing state table FST at time point T52 indicates that the write operation has been completed with respect to the fourth and first real addresses RA4 and RA1 and the write operation is being performed with respect to the fifth real address RA5, the flushing state table FST at time point T53 indicates that the write operation has been completed with respect to the sixth and third real addresses RA6 and RA3 and the write operation is being performed with respect to the seventh real address RA7, and the flushing state table FST at time point T54 indicates that the write operation has been completed with respect to the eighth real address RA8 and the write operation is being performed with respect to the second real address RA2. Whenever the write operation is completed with respect to each of the flushing units FU1 and FU2, the flushing operation may be performed alternately with respect to the first flushing unit FU1 and the second flushing unit FU2.

Figure 16:
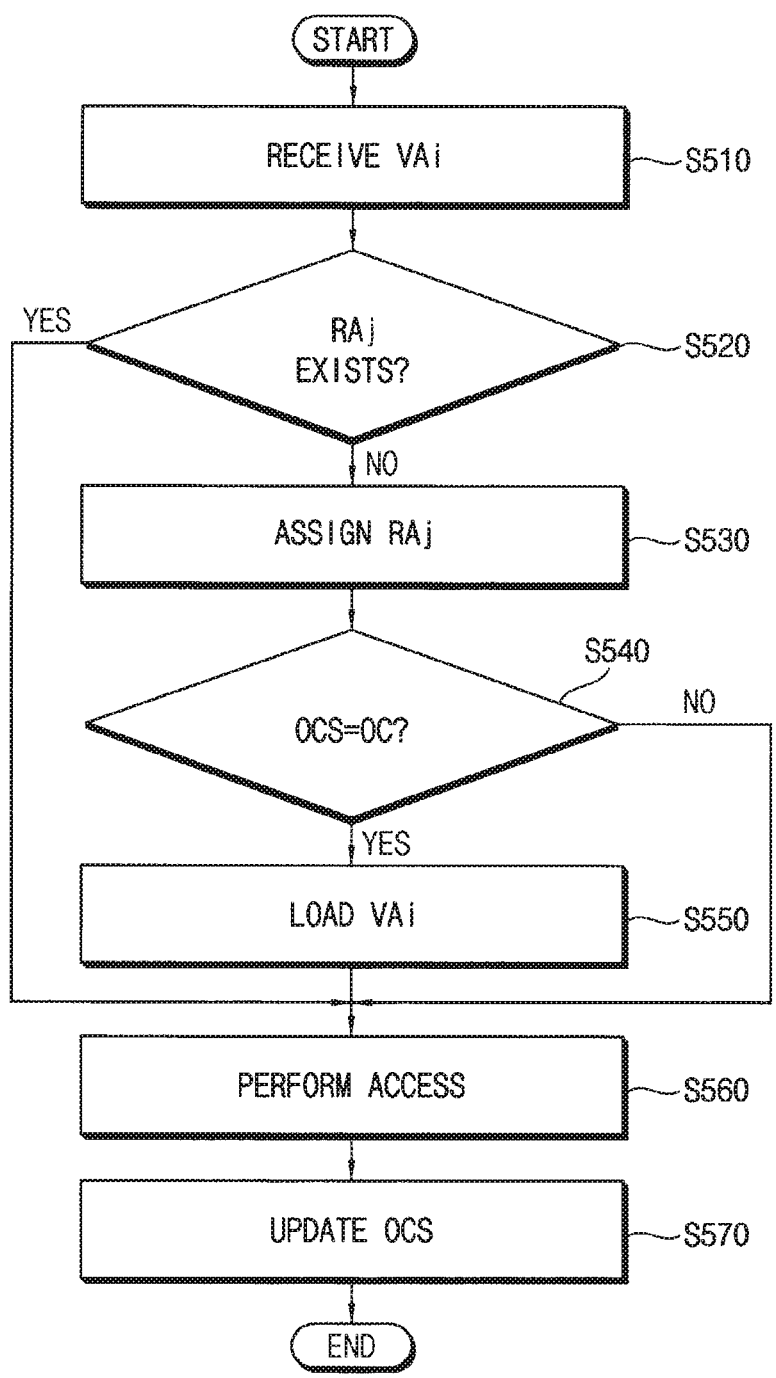
FIG. 16 is a flowchart illustrating a method of operating an electronic system according to an exemplary embodiment of the inventive concept.

FIG. 16 is a flowchart illustrating a method of operating an electronic system according to an exemplary embodiment of the inventive concept.

Referring to FIG. 16, the storage device 200 may receive a virtual address VAi as an access address from the host device 100 (S510). The virtual address VAi may be a write address for a write operation or a read address for a read operation.

The virtual memory controller 230 in the storage device 200 may determine whether a real address RAj mapped to the virtual address VAi exists based on the dynamic mapping table DMT (S520).

When the real address RAj mapped to the virtual address VAi exists in the dynamic mapping table DMT (S520: YES), the virtual memory controller 230 may perform the access operation with respect to the real address RAj (S560). When the real address RAj mapped to the virtual address VAi does not exist in the dynamic mapping table DMT (S520: NO), the virtual memory controller 230 may assign the real address RAj to the virtual address VAi according to the above-described dynamic setting of the mapping relations (S530).

The internal transfer manager 234 in the storage device 200 may determine, based on the occupation state information OCS of the static mapping table SMT, whether the value of the occupation state information OCS corresponding to the virtual address VAi is the first value OC or the second value UO (S540).

When the corresponding value of the occupation state information OCS is the first value OC (S540: YES), the internal transfer manager 234 may load the data of the logic block address mapped to the virtual address VAi to the real address RAj of the host-dedicated memory region HDMR from the flushing memory region FMR of the second memory device MEM2 220 (S550) and then the virtual memory controller 230 may perform the access operation with respect to the real address RAj (S560). Accordingly, the read operation and/or the overwrite operation may be performed while maintaining consistency of the already stored data.

When the corresponding value of the occupation state information OCS is not the first value OC, e.g., the corresponding value of the occupation state information OCS is the second value UO (S540: NO), the virtual memory controller 230 may perform the access operation with respect to the real address RAj (S560) without the loading operation.

As such, when the virtual address VAi is accessed, the storage device 200 may determine, based on the occupation state information OCS, whether to perform the loading operation to store the data of the logic block address mapped to the virtual address VAi to the real address RAj mapped to the virtual address VAi.

After the access operation is completed, the storage device 200 may update the occupation state information OCS corresponding to the virtual address VAi (S570). When the corresponding value of the occupation state information OCS is the first value OC, the first value OC may be maintained regardless of the write operation or the read operation. When the write operation has been performed with respect to the virtual address VAi corresponding to the second value UO, the second value UO may be changed to the first value OC with respect to the virtual address VAi after the write operation is completed.

FIG. 17 is a diagram illustrating example commands of a block accessible interface according to an exemplary embodiment of the inventive concept.

In FIG. 17, "b" represents a binary value and "h" represents a hexadecimal value. "O" represents "optional" and "M" represents "mandatory". The value 00b of OPCODE (01:00) may represent that the data transfer between the host device 100 and the storage device 200 does not occur, the value 01b of OPCODE(01:00) may represent that the data is transferred from the host device 100 to the storage device 200, and the value 10b of OPCODE(01:00) may represent that the data is transferred from the storage device 200 to the host device 100.

The value 0b of OPCODE(07) may represent the block access command STCMD as described above. The commands FL, WR, RD, WU, CP, WZ, and DM corresponding to the block access command STCMD may be, for example, standard commands that are specified in the NVMe standards.

Among the illustrated commands, the zero write command WZ may be a command to write "0" to the write address, e.g., delete the data stored in the write address. Using the zero write command WZ, the host device 100 may delete the data at the logic block address of the flushing memory region FMR of the second memory device MEM2 220 corresponding to the virtual address of the virtual memory region VMR. In this case, the host device 100 may change the value of the occupation state information OCS corresponding to the virtual address from the first value OC to the second value UO, and inform the storage device 200 of the change of the occupation state information OCS.

Figure 18:
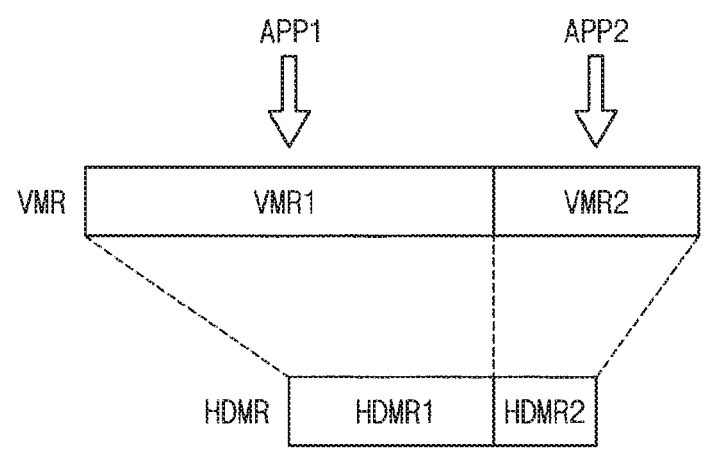
FIG. 18 is a diagram illustrating address mapping in an electronic system according to an exemplary embodiment of the inventive concept.

FIG. 18 is a diagram illustrating address mapping in an electronic system according to an exemplary embodiment of the inventive concept.

Referring to FIG. 18, the host-dedicated memory region HDMR may include a plurality of sub host-dedicated memory regions HDMR1 and HDMR2, and the virtual memory region VMR may include a plurality of sub virtual memory regions VMR1 and VMR2 respectively mapped to the plurality of sub host-dedicated memory regions HDMR1 and HDMR2. FIG. 18 illustrates an example where each of the host-dedicated memory region HDMR and the virtual memory region VMR is divided into two sub regions for convenience of illustration and description, but the inventive concept is not limited thereto.

The storage device 200 may provide each of the plurality of the sub virtual memory regions VMR1 and VMR2 exclusively to each of a plurality of applications APP1 and APP2 of the host device 100. The static mapping table SMT, the dynamic mapping table DMT, and the flushing state table FST as described above may be generated and managed respectively with respect to each of the applications APP1 and APP2. The host device 100 may manage the information or the storage device 200 may manage the information using a function such as Namespace of the NVMe standards. In addition, the storage device 200 may protect the sub virtual memory region of each application using a memory protection unit (MPU) so that one application cannot invade the sub virtual memory region of another application.

Figure 19:
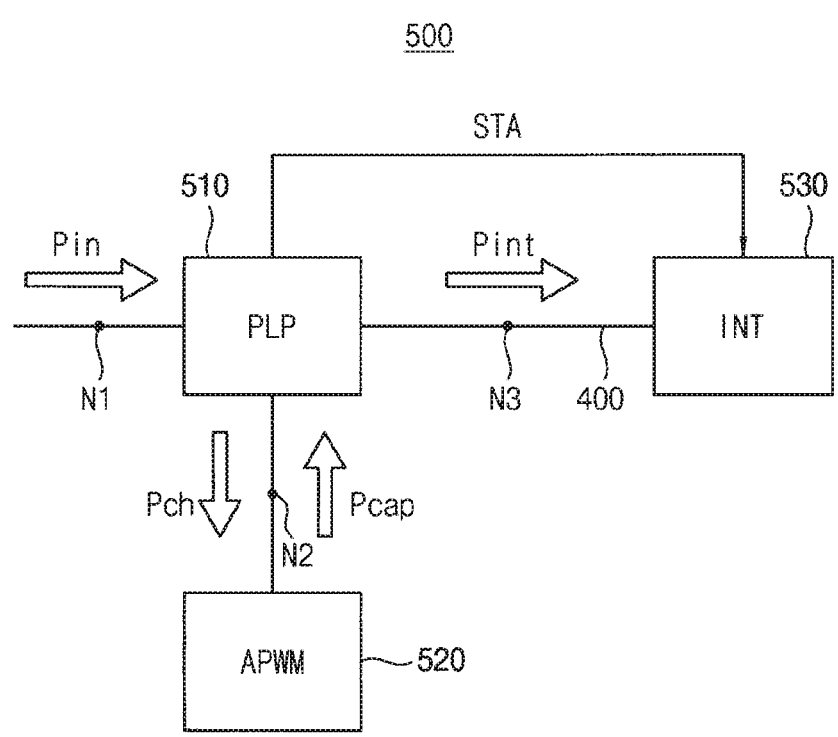
FIG. 19 is a block diagram illustrating a storage device according to an exemplary embodiment of the inventive concept.

FIG. 19 is a block diagram illustrating a storage device according to an exemplary embodiment of the inventive concept.

Referring to FIG. 19, a storage device 500 may include a power loss protection circuit PLP 510, an auxiliary power supply device APWM 520, an internal circuit INT 530, and a power rail 400.

The power loss protection circuit 510 may receive input power Pin through a first node N1. The power loss protection circuit 510 may provide charging power Pch to the auxiliary power supply device 520 or receive auxiliary power Pcap from the auxiliary power supply device 520 through a second node N2. The power loss protection circuit 510 may provide at least one of the input power Pin and the auxiliary power Pcap, or a combination of the input power Pin and the auxiliary power Pcap, as internal power Pint to the internal circuit 530 through a third node N3. The third node N3 is a node on the power rail 400 for supplying power to the internal circuit 530.

The auxiliary power supply device 520 may include a capacitor module or an auxiliary battery. The internal circuit 530 may have various configurations depending on a kind of the storage device 500. For example, the storage device 500 may be a solid state drive (SSD), an embedded multimedia card (eMMC), a universal flash storage (UFS) device, etc. and the internal circuit 530 may include the first memory device of the volatile type, the second memory device of the non-volatile type, and circuits such as the virtual memory controller and the block controller for controlling the first and second memory devices.

The power loss protection circuit 510 may generate a state signal STA indicating the power supply capacity of the auxiliary power supply device 520, and provide the state signal STA to the internal circuit 530 of the storage device 500. The state signal STA may be a multi-bit signal indicating the power supply capacity. The internal circuit 530 may control the operations of the storage device 500 based on the state signal STA. For example, the internal circuit 530 may adjust the above-described flushing size SZF based on the state signal STA.

Figure 20:
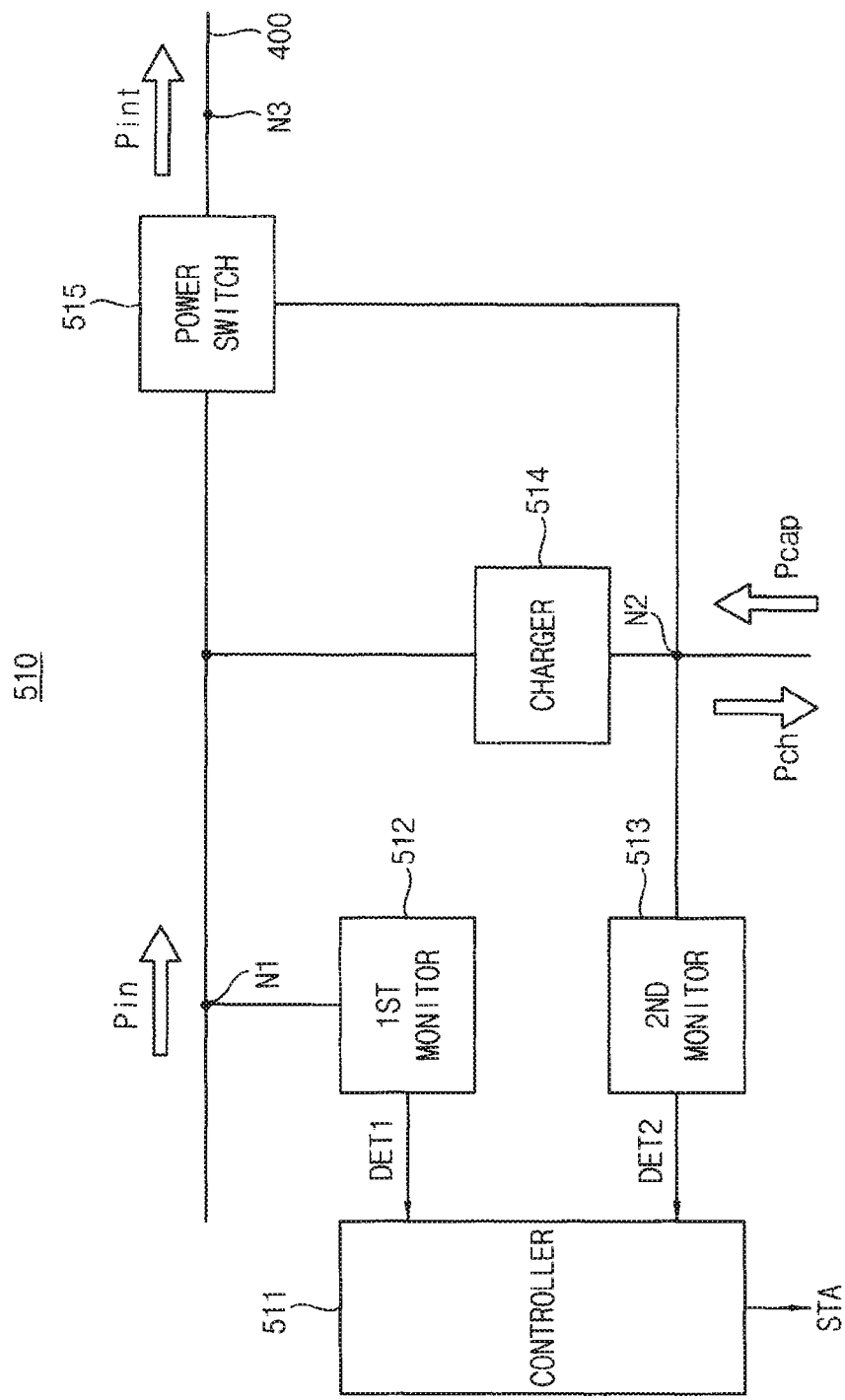
FIG. 20 is a block diagram illustrating a power loss protection (PLP) circuit included in the electronic device of FIG. 19 according to an exemplary embodiment of the inventive concept.

FIG. 20 is a block diagram illustrating a power loss protection (PLP) circuit included in the electronic device of FIG. 19 according to an exemplary embodiment of the inventive concept.

Referring to FIG. 20, a power loss protection circuit 510 may include a controller 511, a first monitor 512, a second monitor 513, a charger 514, and a power switch 515.

The controller 511 may control overall operations of the power loss protection circuit 510. For example, the controller 511 may generate the state signal STA described above.

The first monitor 512 may monitor input power Pin provided through the first node N1 to generate a first detection signal DET1. For example, the first monitor 512 may monitor the input power Pin based on a voltage at the first node N1. If the voltage at the first node N1 becomes lower than a reference level, the first monitor 120 may determine that an interrupt in the input power Pin has occurred and activate the first detection signal DET1 to inform the controller 511 of the interrupt.

The second monitor 513 may monitor states of the auxiliary power supply device 520 to generate a second detection signal DET2, and the controller 511 may generate the state signal STA based on the second detection signal DET2 of the second monitor 513. For example, the second monitor 130 may monitor the states of the auxiliary power supply device 520 based on a voltage and/or a current at the second node N2.

The charger 514 may provide charging power Pch for charging the auxiliary power supply device 520 based on the input power Pin. The timing of the charging operation may be controlled by a control signal from the controller 511. The charging operation may be performed periodically or non-periodically.

The power switch 515 may electrically connect the first node N1 and/or the second node N2 to the third node N3 in response to a control signal from the controller 511. The input power Pin may be provided as the internal power Pint to the internal circuit 530 through the power rail 400 when the first node N1 is electrically connected to the third node N3. The auxiliary power Pcap may be provided as the internal power Pint to the internal circuit 530 through the power rail 400 when the second node N2 is electrically connected to the third node N3.

In some cases, the first node N1 and the second node N2 may be electrically connected to the third node N3 at the same time and thus, a sum of the input power Pin and the auxiliary power Pcap may be provided as the internal power Pint to the internal circuit 530.

Figure 21:
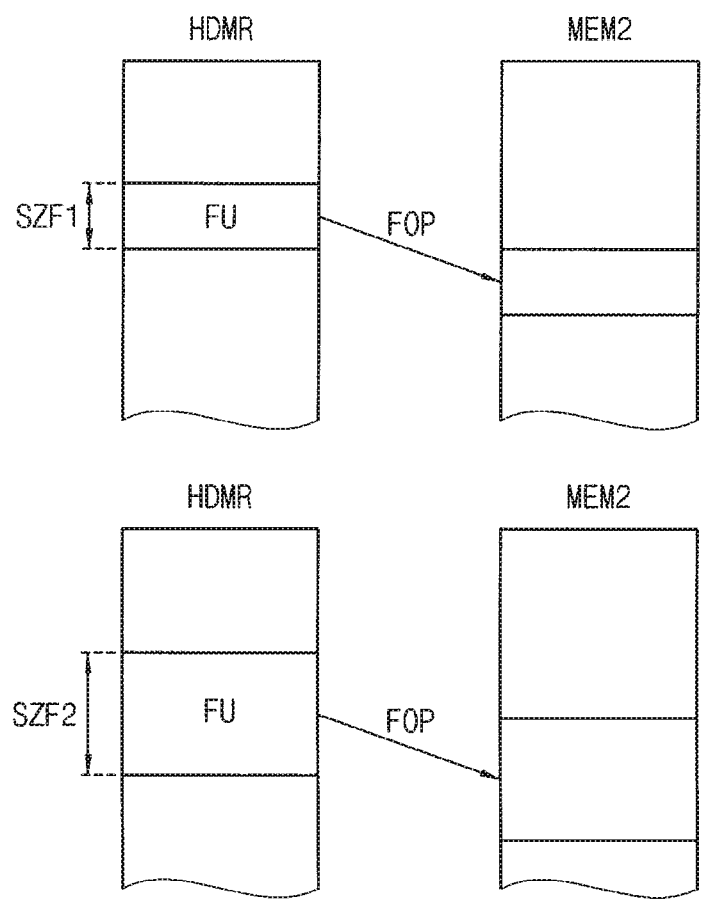
FIG. 21 is a diagram illustrating determining of a flushing size in an electronic system according to an exemplary embodiment of the inventive concept.

FIG. 21 is a diagram illustrating determining of a flushing size in an electronic system according to an exemplary embodiment of the inventive concept.

An upper portion of FIG. 21 represents the flushing operation FOP when the state signal STA indicates that the power supply capacity of the auxiliary power supply device 520 is relatively low, and a lower portion of FIG. 21 represents the flushing operation FOP when the state signal STA indicates that the power supply capacity of the auxiliary power supply device 520 is relatively high. As illustrated in FIG. 21, the above-described flushing size SZF, e.g., the data amount of each flushing operation, may be controlled based on the auxiliary power Pcap.

When the auxiliary power Pcap is relatively lower, the flushing size SZF1 of the flushing unit FU in the host-dedicated memory region HDMR may be set to be relatively smaller. In contrast, when the auxiliary power Pcap is relatively higher, the flushing size SZF2 of the flushing unit FU in the host-dedicated memory region HDMR may be set to be relatively larger.

As such, the flushing operation may be more frequently performed as the auxiliary power Pcap or the power supply capacity of the auxiliary power supply device 520 decreases. Even though the performance of the storage device 200 may be degraded if the flushing operation is performed frequently, the flushing operation may be completed with a lower auxiliary power Pcap to secure the nonvolatility or the persistency of the virtual memory region VMR.

Figure 22:
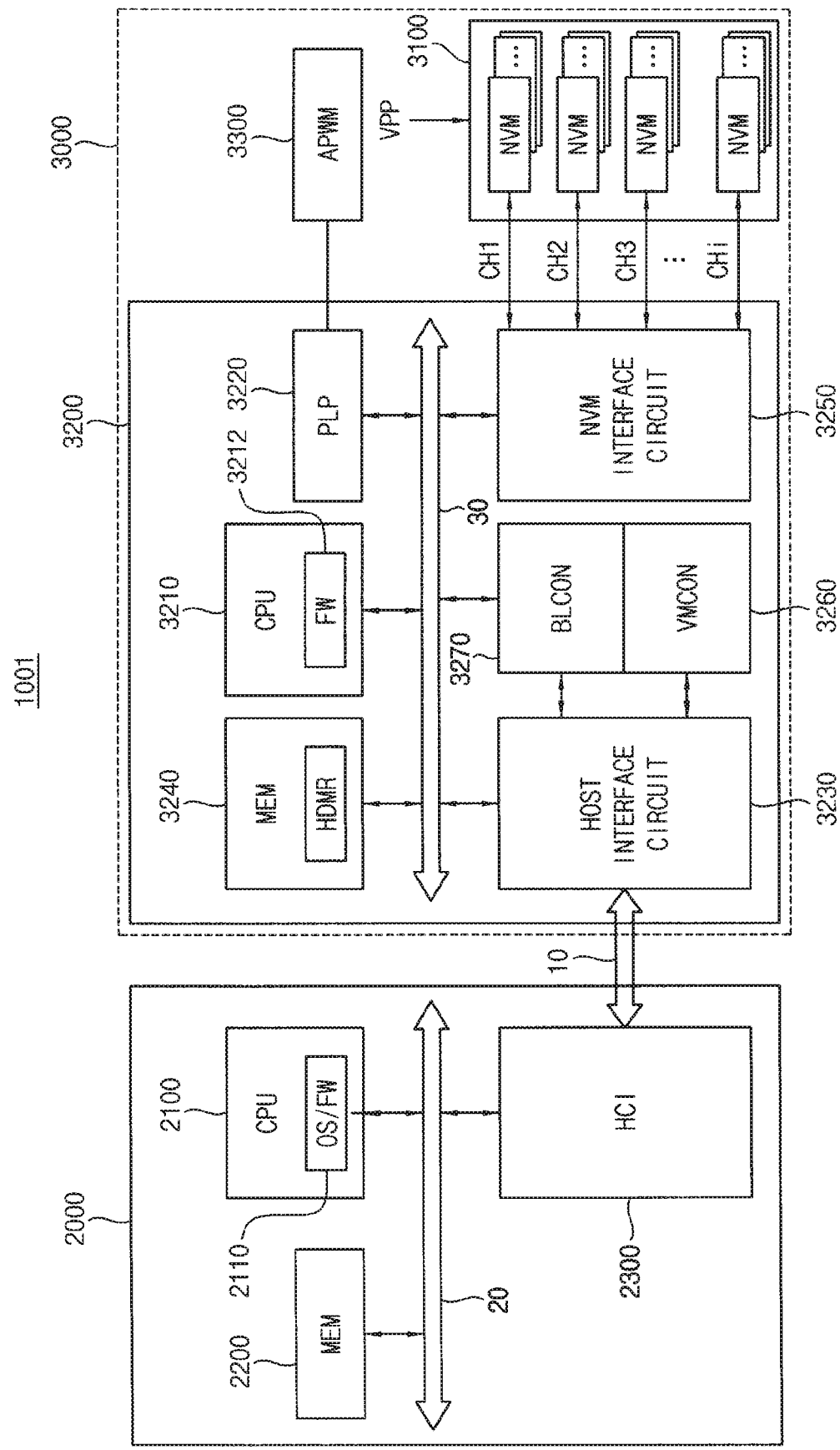
FIG. 22 is a block diagram illustrating an electronic system according to an exemplary embodiment of the inventive concept.

FIG. 22 is a block diagram illustrating an electronic system according to an exemplary embodiment of the inventive concept.

Referring to FIG. 22, a system 1001 includes a host device 2000 and a storage device 3000. For example, the storage device 3000 may be an embedded multimedia card (eMMC), a solid state drive (SSD), etc.

The host device 2000 may be configured to control data processing operations, such as data read operations and data write operations of the storage device 3000. The host device 2000 may be a data processing device, such as a central processing unit (CPU), a processor, a microprocessor, or an application processor, which can process data. The host device 2000 and the storage device 3000 may be embedded or implemented in an electronic device. The host device 2000 and the storage device 3000 may be connected to each other through a bus 10.

The host device 2000 may include a processor (CPU) 2100, memory (MEM) 2200, and a host controller interface (HCI) 2300, which are connected to each other through a bus 20. Operating system (OS) and/or host firmware (FW) 2110 may be executed by the processor 2100. The processor 2100 may include hardware and/or software for controlling generation of a command, analysis of a response to the command, storing of data in the storage device 3000, and/or data processing. The processor 2100 may execute the OS and host firmware 2110 to perform these operations.

The host controller interface 2300 may interface with the storage device 3000. For example, the host controller interface 2300 is configured to issue the command to the storage device 3000, receive the response to the command from the storage device 3000, transmit write data to the storage device 3000, and receive read data from the storage device 3000.

The storage device 3000 may include multiple nonvolatile memory devices (NVM) 3100, a storage controller 3200, and an auxiliary power supply device APWM 3300.

The nonvolatile memory devices 3100 may be optionally supplied with an external high voltage VPP. The nonvolatile memory devices 3100 may be implemented with flash memory, ferroelectric random access memory (FRAM), phase-change random access memory (PRAM), magnetic random access memory (MRAM), etc.

The storage controller 3200 may be connected to the nonvolatile memory devices 3100 through multiple channels CH1 to CHi. The storage controller 3200 may include one or more processors 3210, a power loss protection circuit 3220, a host interface circuit 3230, a volatile memory device MEM 3240, a nonvolatile memory interface circuit 3250, a virtual memory controller VMCON 3260, and a block controller BLCON 3270.

The power loss protection circuit 3220 may monitor the states of the auxiliary power supply device 3300 and generate the state signal STA based on the monitoring result to control the operation of the storage device 3000.

The processor 3210 is configured to control overall operations of the storage controller 3200. For example, the processor 3210 may operate firmware 3212 including a flash translation layer (FTL), etc.

The host interface circuit 3230 may provide an interface with external devices such as the host device 2000. The nonvolatile memory interface circuit 3250 may provide an interface with the nonvolatile memory devices 3100.

The volatile memory device 3240 may correspond to the above-described first memory device MEM1 210 and the nonvolatile memory devices 3100 may correspond to the above-described second memory device MEM2 220.

The virtual memory controller 3260 and the block controller 3270 may be substantially the same as described above and repeat descriptions are omitted.

Figure 23:
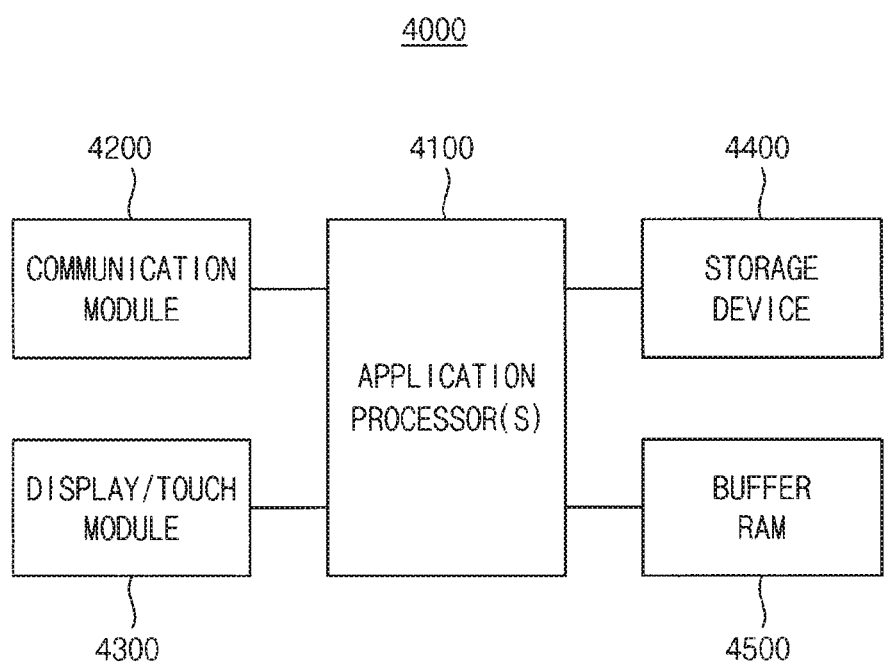
FIG. 23 is a block diagram illustrating a mobile device according to an exemplary embodiment of the inventive concept.

FIG. 23 is a block diagram illustrating a mobile device according to an exemplary embodiment of the inventive concept.

Referring to FIG. 23, a mobile device 4000 may include at least one application processor 4100, a communication module 4200, a display/touch module 4300, a storage device 4400, and a buffer RAM 4500.

The application processor 4100 controls operations of the mobile device 4000. The application processor 4100 may execute at least one application to provide an internet browser, games, videos, or the like. The communication module 4200 is implemented to perform wireless or wired communications with an external device. The display/touch module 4300 is implemented to display data processed by the application processor 4100 and/or to receive data through a touch panel. The storage device 4400 is implemented to store user data.

The storage device 4400 may be an embedded multimedia card (eMMC), a solid state drive (SSD, a universal flash storage (UFS) device, etc. The storage device 4400 may provide the virtual memory region VMR to the application processor 4100 as described above according to exemplary embodiments of the inventive concept.

The buffer RAM 4500 temporarily stores data used for processing operations of the mobile device 4000. For example, the buffer RAM 4500 may be Double Data Rate Synchronous Dynamic Random Access Memory (DDR SDRAM), Low Power DDR SDRAM (LPDDR SDRAM), Graphic DDR SDRAM (GDDR SDRAM), Rambus DRAM (RDRAM), etc.

As described above, the storage device, the electronic system, and the method according to exemplary embodiments of the inventive concept may provide the virtual memory region having a larger size than the host-dedicated memory region corresponding to real memory resources by dynamically changing the mapping relations between the host-dedicated memory region and the virtual memory region to reduce a size and enhance performance of the storage device and the electronic system. In addition, the storage device, the electronic system, and the method according to exemplary embodiments of the inventive concept may support nonvolatility of the virtual memory region through a flushing operation and efficiently support access in units of bytes and access in units of blocks between the host device and the storage device to enhance performance of the storage device and the electronic system.

The inventive concept may be applied to any electronic devices and systems. For example, the inventive concept may be applied to systems such as a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

While the inventive concept has been shown and described with reference to exemplary embodiments thereof, those of ordinary skill in the art will readily appreciate that many modifications in form and details may be made thereto without materially departing from spirit and scope of the inventive concept as set forth by the following claims.

What is claimed is:

1. An electronic system comprising:
a host device; and
a storage device including a virtual memory controller, a first memory device of a volatile type accessed exclusively through the virtual memory controller, and a second memory device of a nonvolatile type,
wherein the first memory device is accessed by the host device through a memory-mapped input-output interface,
wherein the second memory device is accessed by the host device through a block accessible interface, and
wherein the storage device is configured to provide a virtual memory region to the host device such that a host-dedicated memory region having a first size and included in the first memory device is mapped to the virtual memory region having a second size larger than the first size.

2. The electronic system of claim 1, wherein the storage device generates a dynamic mapping table including mapping relations between real addresses of the host-dedicated memory region and virtual addresses of the virtual memory region and dynamically changes the mapping relations of the dynamic mapping table according to progression of an access operation by the host device with respect to the virtual memory region.

3. The electronic system of claim 2, wherein the host device generates a static mapping table including mapping relations between the virtual addresses of the virtual memory region and logic block addresses of a flushing memory region having the second size included in the second memory device, and provides the static mapping table to the storage device.

4. The electronic system of claim 3, wherein the static mapping table further includes occupation state information indicating whether data are stored at each logic block address that is mapped to a corresponding virtual address.

5. The electronic system of claim 4, wherein, when a first virtual address is accessed, the storage device determines based on the occupation state information whether to perform a loading operation to store data of a first logic block address, mapped to the first virtual address, to a first real address mapped to the first virtual address.

6. The electronic system of claim 2, wherein the storage device supports nonvolatility of the virtual memory region such that all of data stored in the virtual memory region are maintained even though power of the storage device is blocked.

7. The electronic system of claim 2, wherein the storage device sets a persistent memory region including a plurality of flushing units with respect to the host-dedicated memory region and performs a flushing operation to store data of one flushing unit of the plurality of flushing units in the second memory device when a write operation with respect to the one flushing unit is completed.

8. The electronic system of claim 7, wherein the host device performs an appending write operation to store data in the virtual memory region with increasing the virtual addresses that are sequentially increased.

9. The electronic system of claim 8, wherein the storage device sequentially increases a flushing position, corresponding to a start position of the persistent memory region, by a flushing size of each flushing unit starting from a start address of the host-dedicated memory region whenever the flushing operation with respect to each flushing unit is completed, and returns the flushing position to the start address of the host-dedicated memory region when the flushing position reaches a last address of the host-dedicated memory region.

10. The electronic system of claim 8, wherein the storage device generates a flushing state table including mapping relations between the plurality of flushing units and the real addresses at which the appending write operation has been performed and performs the flushing operation based on the flushing state table.

11. The electronic system of claim 7, wherein the host device performs a random write operation to store data in the virtual memory region regardless of a sequential order of the virtual addresses.

12. The electronic system of claim 11, wherein the dynamic mapping table further includes write order information indicating an order of the real addresses at which the random write operation has been performed.

13. The electronic system of claim 12, wherein the storage device generates a flushing state table including the write order information and mapping relations between the plurality of flushing units and the real addresses at which the random write operation has been performed and performs the flushing operation based on the flushing state table.

14. The electronic system of claim 7, further comprising an auxiliary power supply device configured to provide power to the storage device when an interrupt occurs in an input power provided to the storage device,
wherein a flushing size of each of the plurality of flushing units is determined within a power supply capacity of the auxiliary power supply device.

15. The electronic system of claim 1, wherein the host-dedicated memory region includes a plurality of sub host-dedicated memory regions, the virtual memory region includes a plurality of sub virtual memory regions respectively mapped to the plurality of sub host-dedicated memory regions, and each of the plurality of the sub virtual memory regions is provided exclusively to one of a plurality of applications of the host device.

16. A storage device comprising:
a first memory device configured to be accessed by a host device through a memory-mapped input-output interface;
a second memory device configured to be accessed by the host device through a block accessible interface; and
a virtual memory controller configured to provide a virtual memory region to the host device such that a host-dedicated memory region having a first size and included in the first memory device is mapped to the virtual memory region having a second size larger than the first size,
wherein the first memory device is accessible exclusively through the virtual memory controller.

17. The storage device of claim 16, wherein the virtual memory controller includes a mapping manager configured to generate a dynamic mapping table including mapping relations between real addresses of the host-dedicated memory region and virtual addresses of the virtual memory region, and dynamically change the mapping relations of the dynamic mapping table according to progression of an access operation by the host device with respect to the virtual memory region.

18. The storage device of claim 17, wherein the virtual memory controller further includes an internal transfer manager configured to control a data transfer between the first memory device and the second memory device based on the dynamic mapping table and a static mapping table including mapping relations between the virtual addresses of the virtual memory region and logic block addresses of a flushing memory region of the second size included in the second memory device and occupation state information indicating whether data are stored at each logic block address that is mapped to a corresponding virtual address, and
the virtual memory controller provides the static mapping table to the storage device.

19. The storage device of claim 18, wherein the internal transfer manager sets a persistent memory region including a plurality of flushing units with respect to the host-dedicated memory region and performs a flushing operation to store data of one flushing unit of the plurality of flushing units in the second memory device when a write operation with respect to the one flushing unit is completed.

20. A method of operating an electronic system including a host device and a storage device, the method comprising:
accessing, by the host device, a first memory device included in the storage device through a memory-mapped input-output interface, exclusively through a virtual memory controller;
accessing, by the host device, a second memory device included in the storage device through a block accessible interface; and
providing, by the storage device, a virtual memory region to the host device such that a host-dedicated memory region having a first size and included in the first memory device is mapped by the virtual memory controller to the virtual memory region having a second size larger than the first size.

* * * * *